(12) United States Patent
Al Moyaibed et al.

(10) Patent No.: US 11,630,232 B2
(45) Date of Patent: Apr. 18, 2023

(54) INTELLIGENT PIPE CAPACITY MEASURING DEVICE

(71) Applicant: SAUDI ARABIAN OIL COMPANY, Dhahran (SA)

(72) Inventors: Jasem Mohammed Al Moyaibed, Dhahran (SA); Zakaria Ibrahim Albu, Tarut (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 107 days.

(21) Appl. No.: 17/191,165

(22) Filed: Mar. 3, 2021

(65) Prior Publication Data

US 2022/0283334 A1  Sep. 8, 2022

(51) Int. Cl.
*E21B 47/085* (2012.01)
*G01V 8/00* (2006.01)

(52) U.S. Cl.
CPC ............ *G01V 8/005* (2013.01); *E21B 47/085* (2020.05)

(58) Field of Classification Search
None
See application file for complete search history.

(56) References Cited

U.S. PATENT DOCUMENTS

| | | | |
|---|---|---|---|
| 5,469,062 A | 11/1995 | Meyer, Jr. | |
| 2019/0078434 A1* | 3/2019 | Amineh | G01N 27/9046 |
| 2020/0081148 A1* | 3/2020 | Capoglu | E21B 47/024 |
| 2020/0333500 A1* | 10/2020 | Fouda | E21B 47/006 |

FOREIGN PATENT DOCUMENTS

EP   0704717 A2   4/1996

\* cited by examiner

*Primary Examiner* — Patrick Assouad
*Assistant Examiner* — Haidong Zhang
(74) *Attorney, Agent, or Firm* — Osha Bergman Watanabe & Burton LLP

(57) ABSTRACT

A measuring device for a tube is disclosed. The measuring device includes a drift tool configured to verify roundness of the tube, a first electromagnetic (EM) emitter disposed on the drift tool and configured to emit EM waves while the drift tool drifts inside the tube, and an EM receiver disposed on the drift tool and configured to receive the EM waves reflected from an internal surface of the tube, wherein parameters of the emitted and received EM waves are analyzed to compute an internal diameter of the tube.

18 Claims, 4 Drawing Sheets

INTELLIGENT PIPE CAPACITY MEASURING DEVICE

BACKGROUND

Pipe drifting is the act of passing gauges called 'drift tools' or 'rabbits' through casings, tubulars and completion components to test the roundness of the internal passage, and to verify that there are no dents, bends or flat areas that would prevent downhole tooling from passing through. Pipe drifting is performed in oil industry using standard drift tools of known diameters.

Oil Country Tubular Goods (OCTG) refers to the casing, tubing, piping and pipelines used in the petroleum industry, e.g., as defined in the American Petroleum Institute (API) specifications, International Specifications Organization (ISO) Standards, etc. Currently, OCTG products' internal tube capacity is determined through estimation that is calculated by the tabulated nominal internal diameter (Pipe ID) in product specification sheets of the drift tools. Considering the allowable manufacturing tolerances, this calculation may not be accurate, which creates operational complications, high cost implementation, or potential risk of failures.

SUMMARY

In general, in one aspect, the invention relates to a measuring device for a tube. The measuring device includes a drift tool configured to verify roundness of the tube, a first electromagnetic (EM) emitter disposed on the drift tool and configured to emit EM waves while the drift tool drifts inside the tube, and an EM receiver disposed on the drift tool and configured to receive the EM waves reflected from an internal surface of the tube, wherein parameters of the emitted and received EM waves are analyzed to compute an internal diameter of the tube.

In general, in one aspect, the invention relates to a method to measure a tube. The method includes disposing a drift tool inside the tube to verify roundness of the tube, disposing a first electromagnetic (EM) emitter on the drift tool that emits EM waves while the drift tool drifts inside the tube, disposing an EM receiver on the drift tool that receives the EM waves reflected from an internal surface of the tube, and analyzing parameters of the emitted and received EM waves to compute an internal diameter of the tube.

Other aspects and advantages will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of this disclosure provide a device that drifts along a tubular to measure the internal diameter and fluid flow capacity of the tube. In particular, the device uses electromagnetic waves to collect data that is used to calculate the tube internal diameter. In one or more embodiments, the device is a modified drift tool that includes electromagnetic signal emitter(s) and receiver(s) with electromagnetic data recording capability for calculating the exact tube internal capacity. For example, a signal emitter may be disposed at each end of the drifting tool, and a signal receiver is disposed in the middle of the drifting tool.

Figure 1:
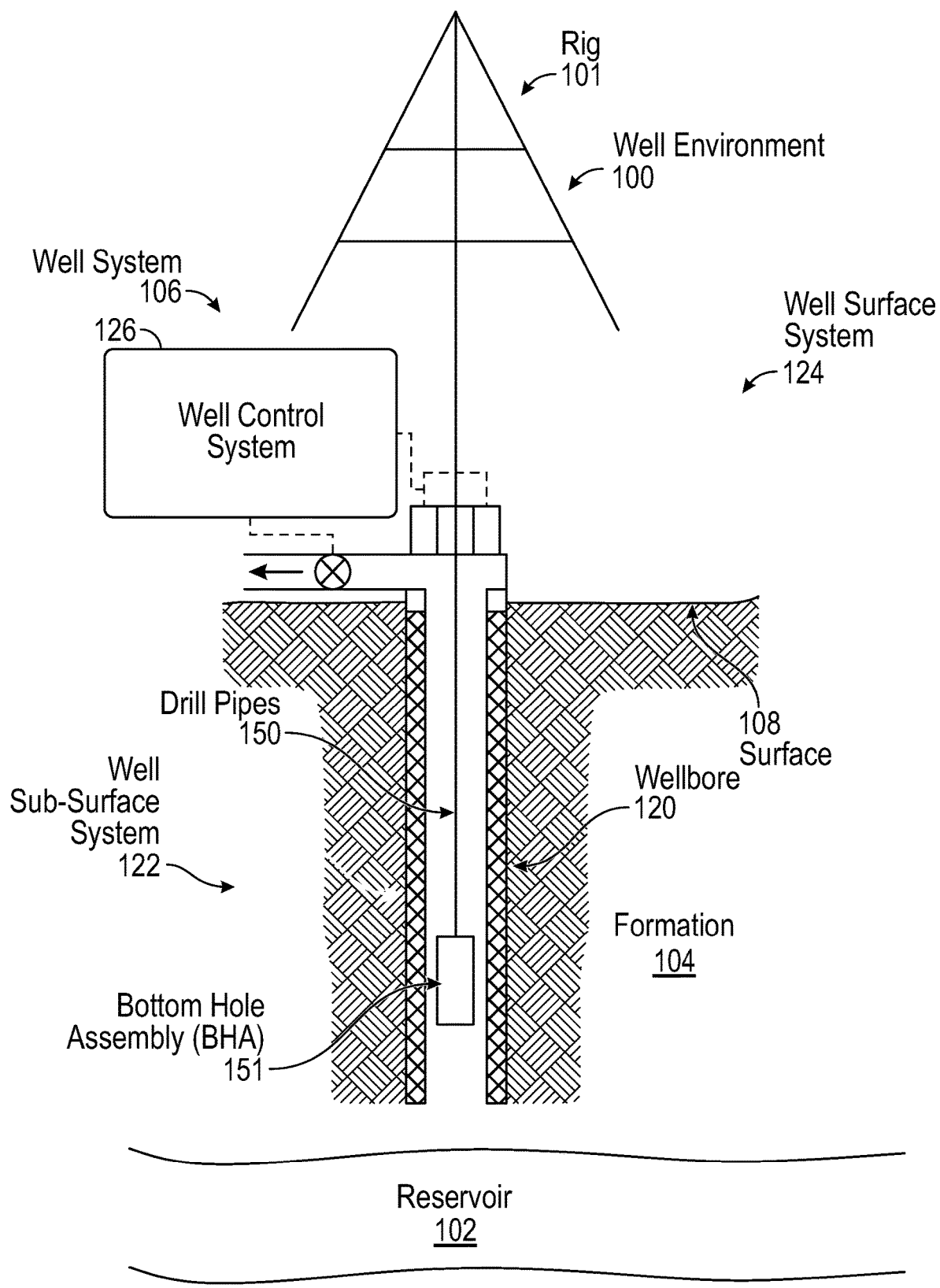
FIG. 1 shows a wellsite in accordance with one or more embodiments.

FIG. 1 shows a schematic diagram in accordance with one or more embodiments. As shown in FIG. 1, a well environment (100) includes a subterranean formation ("formation") (104) and a well system (106). The formation (104) may include a porous or fractured rock formation that resides underground, beneath the earth's surface ("surface") (108). The formation (104) may include different layers of rock having varying characteristics, such as varying degrees of permeability, porosity, capillary pressure, and resistivity. In the case of the well system (106) being a hydrocarbon well, the formation (104) may include a hydrocarbon-bearing reservoir (102). In the case of the well system (106) being operated as a production well, the well system (106) may facilitate the extraction of hydrocarbons (or "production") from the reservoir (102).

In some embodiments disclosed herein, the well system (106) includes a rig (101), a wellbore (120), a well subsurface system (122), a well surface system (124), and a well control system ("control system") (126). The well control system (126) may control various operations of the well system (106), such as well production operations, well drilling operation, well completion operations, well maintenance operations, and reservoir monitoring, assessment and development operations. In some embodiments, the well control system (126) includes a computer system.

The rig (101) is the machine used to drill a borehole to form the wellbore (120). Major components of the rig (101) include the drilling fluid tanks, the drilling fluid pumps (e.g., rig mixing pumps), the derrick or mast, the draw works, the rotary table or top drive, the drill string, the power generation equipment and auxiliary equipment. Drilling fluid, also referred to as "drilling mud" or simply "mud," is used to facilitate drilling boreholes into the earth, such as drilling oil and natural gas wells. The main functions of drilling fluids include providing hydrostatic pressure to prevent formation fluids from entering into the borehole, keeping the drill bit cool and clean during drilling, carrying out drill cuttings, and suspending the drill cuttings while drilling is paused and when the drilling assembly is brought in and out of the borehole.

The wellbore (120) includes a bored hole (i.e., borehole) that extends from the surface (108) towards a target zone of the formation (104), such as the reservoir (102). An upper end of the wellbore (120), terminating at or near the surface (108), may be referred to as the "up-hole" end of the wellbore (120), and a lower end of the wellbore, terminating in the formation (104), may be referred to as the "downhole" end of the wellbore (120). The wellbore (120) may facilitate the circulation of drilling fluids during drilling operations for the wellbore (120) to extend towards the target zone of the formation (104) (e.g., the reservoir (102)), facilitate the flow of hydrocarbon production (e.g., oil and gas) from the reservoir (102) to the surface (108) during production operations, facilitate the injection of substances (e.g., water) into the hydrocarbon-bearing formation (104) or the reservoir (102) during injection operations, or facilitate the communication of monitoring devices (e.g., logging tools) lowered into the formation (104) or the reservoir (102) during monitoring operations (e.g., during in situ logging operations).

In some embodiments, the well system (106) is provided with a bottom hole assembly (BHA) (151) attached to drill pipes (150) to suspend into the wellbore (120) for performing the well drilling operation. The bottom hole assembly (BHA) is the lowest part of a drill string and includes the drill bit, drill collar, stabilizer, mud motor, etc. A mud motor is a drilling motor that uses hydraulic horsepower of the drilling fluid to drive the drill bit during the drilling operation. In some embodiments, the well system (106) includes other OCTG products in addition to the drill pipes (150) where the internal diameters and roundness of the drill pipes (150) and other OCTG products are measured and verified using a drift tool. In one or more embodiments, the drift tool is described in reference to FIGS. 2A-2C below that measures the internal diameter and fluid flow capacity of a drill pipe or other OCTG product using electromagnetic waves. The fluid flow capacity corresponds to the cross sectional area of the tube, which is proportional to the diameter squared. For example, the drill pipe or other OCTG product may be measured using electromagnetic waves by the drift tool at the surface (108) prior to being deployed into the rig (101) and/or the wellbore (120). In another example, the drill pipe or other OCTG product may be measured using electromagnetic waves by the drift tool after being deployed into the rig (101) and/or the wellbore (120).

Turning to FIGS. 2A-2D, FIGS. 2A-2D illustrate devices for measuring the internal diameter and fluid flow capacity of the OCTG products using electromagnetic waves in accordance with one or more embodiments disclosed herein. In one or more embodiments, one or more of the modules and/or elements shown in FIGS. 2A-2D may be omitted, repeated, combined and/or substituted. Accordingly, embodiments disclosed herein should not be considered limited to the specific arrangements of modules and/or elements shown in FIGS. 2A-2D.

Figure 2A:
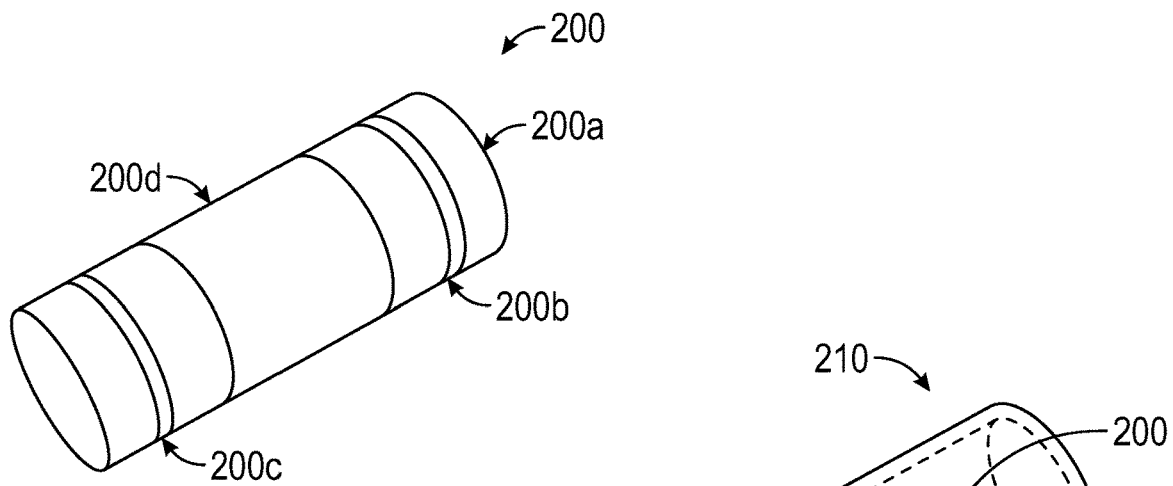
FIGS. 2A, 2B, 2C, and 2D show a device in accordance with one or more embodiments.

FIG. 2A shows a capacity measuring device (200) that is a modified drift tool. As shown in FIG. 2A, the capacity measuring device (200) includes a drift tool (200a) that is modified to have one or more electromagnetic (EM) emitters (200b, 200c) and an EM receiver (200d). In one or more embodiments, the drift tool (200a) is a normal drift tool conforming to related API and/or ISO standards. For example, the drift tool (200a) may be a cylinder of a specific diameter, length, and material according to the API and/or ISO standards. Specifically, the EM emitters (200b, 200c) include two ring-shaped EM wave emitters placed close to each end of the drift tool (200a). The EM receiver (200d) is a ring-shaped EM wave receiver placed at or near the middle of the drift tool (200a). Each ring-shaped EM wave emitter can be placed anywhere between one end of the drift tool and the ring-shaped EM wave receiver. Keeping the EM wave emitter closer to the end of the drift tool allows for better transmission for the EM wave. The EM wave emitter should not be placed at the edge of the drift tool to avoid being damaged. In one or more embodiments, the EM emitters (200b, 200c) and the EM receiver (200d) are activated by a controller that is capable of recording the emitted and received EM data.

For example, the controller may be an embedded controller that is integrated with the capacity measuring device (200). In one or more embodiments, the embedded controller is provided with functionality to analyze the emitted and received EM data to generate the output data (i.e., internal diameter and/or fluid flow capacity) of the capacity measuring device (200). In an alternative embodiment, the embedded controller sends the emitted and received EM data to a remote computing device that computes the internal diameter and/or fluid flow capacity based on the EM data. In another example, the controller may be a remote controller that is separate from the capacity measuring device (200) and communicates wirelessly with the EM emitters (200b, 200c) and the emitter receiver (200d). The remote controller may be combined with a remote computing device that computes the internal diameter and/or fluid flow capacity based on the EM data. In one or more embodiments, the controller and the remote computing device may be implemented based on the computing system described in reference to FIGS. 4A-4B below.

Figure 2B:
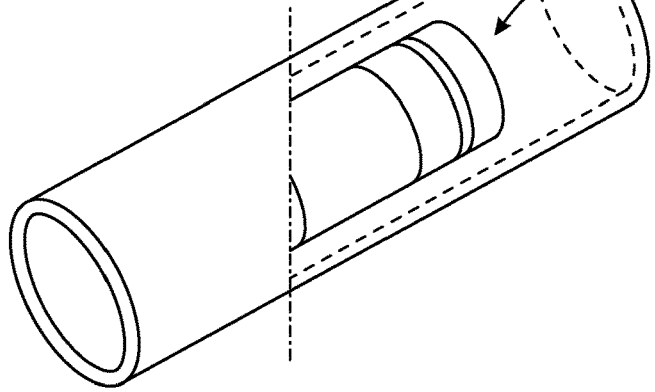

FIG. 2B shows the capacity measuring device (200) inside a tube (210). The tube (210) corresponds to the drill pipes (150) or other OCTG products depicted in FIG. 1 above. As shown in FIG. 2B, the capacity measuring device (200) drifts along the tube (210) by a vacuum-powered, compressed air, or a rope pull through mechanism while using EM waves to measure the internal diameter and/or fluid flow capacity of the tube (210). Due to the symmetrical placement of the EM emitters (200b, 200c) and the emitter receiver (200d) with respect to the center of the drift tool (200a), the capacity measuring device (200) performs the measurements in the same manner when drifting in either direction inside the tube (210).

Figure 2C:
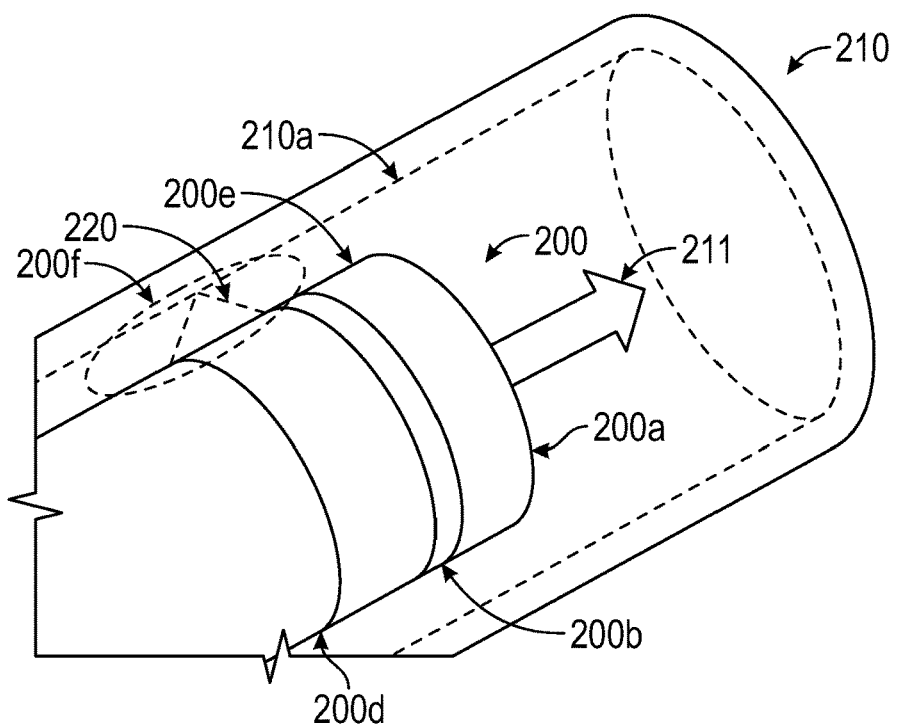

FIG. 2C shows additional details of the capacity measuring device (200) inside a tube (210). As shown in FIG. 2C, the capacity measuring device (200) drifts along the drifting direction (211) according to the arrow. Due to manufacturing tolerance of the tube (210) and the specific diameter of the drift tool (200a) based on the API/ISO specification, a gap (200f) is formed between the internal surface (210a) of the tube (210) and the cylindrical surface (200e) of the drift tool (200a). As the capacity measuring device (200) drifts at a controlled speed, the EM emitter (200b) emits EM waves (220) that are reflected by the internal surface (210a) and received by the EM receiver (200d). For example, the EM waves (220) may be within a frequency range below Gamma Ray frequencies (e.g., $10^{19}$ hertz) to achieve appropriate reflection characteristics from the internal surface (210a) of the tube (210). In general, lower EM frequency waves are more suitable than high frequency waves, as low frequencies do not penetrate the tube body and will better reflect to the EM receiver. High frequencies such as the Gamma Ray frequency range might penetrate the tube body and lose some of the waves emitted. With higher frequency waves, although system will still function as required, the efficiency of received waves verses emitted waves will decrease. In one or more embodiments, the EM waves (220) are emitted only from the EM emitter that is placed near the leading edge of the drift tool (200a). In other words, when the capacity measuring device (200) drifts along the drifting direction (211), the EM emitter (200b) emits the EM waves but the EM emitter (200c) does not emit any EM waves. In contrast, when the capacity measuring device (200) drifts along the direction opposite to the arrow (i.e., drifting direction (211)), the EM emitter (200c) emits the EM waves but the EM emitter (200b) does not emit any EM waves.

In either case, whether the EM emitter (200b) or EM emitter (200c) emits the EM waves, the EM receiver (200d) detects the reflected EM waves and records various EM wave parameters, such as the wavelength, travel time, and wave incidence angle. The incidence angle is the angle between a ray of EM wave incident on the surface (210a) and a line perpendicular to the surface (210a) at the point of incidence, referred to as the normal. The recorded EM wave parameters, such as the wavelength, travel time, and wave incidence angle, are analyzed by the aforementioned controller and/or computing device to compute the internal diameter and/or fluid flowing capacity of the tube (210). In particular, the distance between the internal surface (210a) and the cylindrical surface (200e) in the gap (200f) is computed based on the travel time and the incidence angle. Accordingly, the internal diameter of the tube (210) is determined as the sum of the known diameter of the drift tool (200a) and the computed gap distance. The computed internal diameters and/or fluid flowing capacities at a sequence of positions traversed by the capacity measuring device (200) inside the tube (210) are then compiled to generate a profile or an average/nominal value of the internal diameter and/or fluid flowing capacity of the tube (210).

Figure 2D:
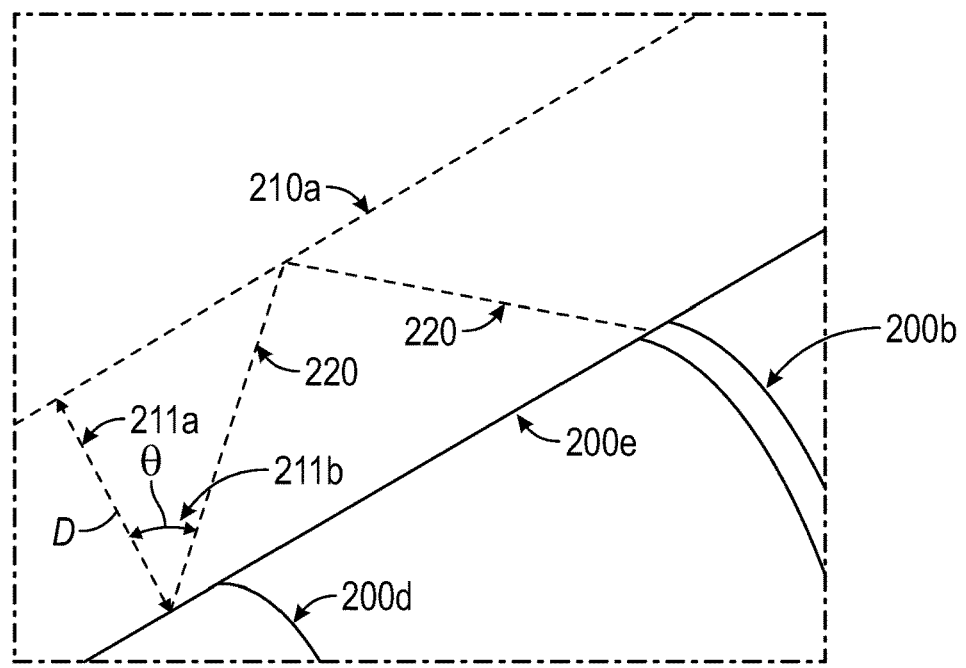

FIG. 2D shows further details of the EM wave (220) reflecting by the internal surface (210a) of the tube (210). As shown in FIG. 2D, the gap distance (211a) is determined using the equation below where D denotes the gap distance (211a), T denotes the EM travel time, C denotes the EM travel speed, and θ denotes the incidence angle (211b). As noted above, the EM travel time T and the EM travel speed C are recorded using the EM receiver (200d) and the associated controller/computing device.

$$D=(T/2)C(\cos \theta)$$

Specifically, (T/2)C equals to the length of half the travel path of the EM wave (220) from the EM emitter (200b) to the EM receiver (200d). In other words, (T/2)C equals to the length of the chord of the triangle formed by the gap distance (211a), the incidence angle (211b), and the cylindrical surface (200e) of the drift tool (200a). Depending on the EM wave characteristics, the EM travel speed C is determined based on the EM wavelength. Once the gap distance D is determined using the equation above, the internal diameter of the tube (210) is determined as the sum of the gap distance D and the known outer diameter of the drift tool (200a). As noted above, the gap distance D and the internal diameter of the tube (210) are computed using the controller/computing device associated with the measuring device (200).

Those skilled in the art will appreciate that configurations of the capacity measuring device (200) may be different than that described above, without departing from the scope of this disclosure. For example, the EM emitters (200b) and the EM receiver (200c) may be placed at different locations than the ends and middle of the drift tool (200a), and/or may be different than the ring shape described above. The EM emitters (200b) and the EM receiver (200c) may operate over a wide frequency range of the EM waves. Further, the drift tool (200a) may have different shape, construction, material, and manufactured by different manufactures of drift tools.

Figure 3:
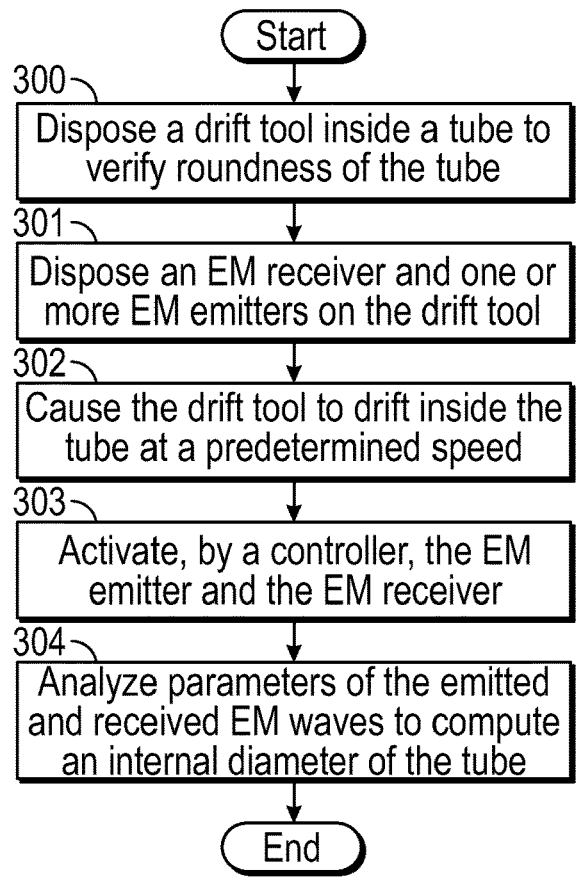
FIG. 3 shows a flowchart in accordance with one or more embodiments.

Turning to FIG. 3, FIG. 3 shows a process flowchart in accordance with one or more embodiments. One or more blocks of FIG. 3 may be performed using one or more components as described in FIGS. 1 and 2A-2C. While the various blocks in FIG. 3 are presented and described sequentially, one of ordinary skill in the art will appreciate that some or all of the blocks may be executed in a different order, may be combined or omitted, and some or all of the blocks may be executed in parallel and/or iteratively. Furthermore, the blocks may be performed actively or passively.

Initially in Block 300, a drift tool is disposed inside a tube to verify roundness of the tube. In one or more embodiments, the tube is an Oil Country Tubular Good (OCTG), and the drift tool is specified based on American Petroleum Institute (API) specification.

In Block 301, an electromagnetic (EM) receiver and one or more EM emitters are disposed on the drift tool. In one or more embodiments, the EM receiver is disposed at a mid-point of the drift tool, and a first EM emitter and a second EM emitter are disposed at opposite sides of the EM receiver, e.g., at opposite ends of the drift tool, close to the ends of the cylindrical body of the drift tool. In one or more embodiments, the EM receiver, the first EM emitter, and the second EM emitter are disposed on a cylindrical surface of the drift tool. In particular, each of the EM receiver, the first EM emitter, and the second EM emitter has a ring shape around a cross sectional circumference of the cylindrical surface of the drift tool.

In Block 302, the drift tool is caused to drift inside the tube at a predetermined, controlled speed. In one or more embodiments, a vacuum pull through mechanism, compressed air pull through mechanism, or a rope pull through mechanism is used to cause the drift tool to drift inside the tube.

In Block 303, the first EM emitter and the EM receiver are activated by a controller in response to the drift tool drifting inside the tube. In one or more embodiments, the first EM emitter emits the EM waves when the drift tool drifts inside the tube in a direction leading by the first EM emitter. More specifically, in Block 303, the emitter starts emitting electromagnetic waves along the radiance of the tube from the emitter at the side of drift direction. In contrast, the second EM emitter does not emit any EM waves when the drift tool drifts inside the tube in the direction leading by the first EM emitter.

In Block 304, parameters of the emitted and received EM waves are analyzed to compute an internal diameter of the tube. In one or more embodiments, a gap distance between the internal surface of the tube and a cylindrical surface of the drift tool is determined based on the parameters of the emitted and received EM waves. For example, the parameters may include a wavelength, a wave incidence angle, and a wave travel time of the EM waves detected by the electromagnetic wave receiver. Accordingly, the internal diameter of the tube is determined as a sum of the gap distance and a predetermined outer diameter of the drift tool. In one or more embodiments, the parameters of the emitted and received EM waves are analyzed by a computing device to compute the internal diameter of the tube. In one or more embodiments, the internal diameter computed above is used to accurately determine required amount of drilling fluids in the drill pipe to provide (i) cost saving for the drilling fluids, and (ii) prevent potential hazard of well fluid flowback due to shortage of drilling fluid quantity. Similarly, the internal diameter computed above is used to accurately determine required cement quantity to fill in-between tubular strings. Further, the internal diameter computed above serves as a warning system to over-torque incidents that lead to pipe internal diameter (ID) reduction.

Using the modified drift tool as described above reduces well site operational time because the pipe roundness verification and the internal diameter measurements are combined as a single process. In addition, a single tool is used to measure internal diameters of multiple pipes having different sizes. In contrast, in the conventional pipe drifting process, different size pipes require multiple drift tools having specific diameters.

Figure 4A:
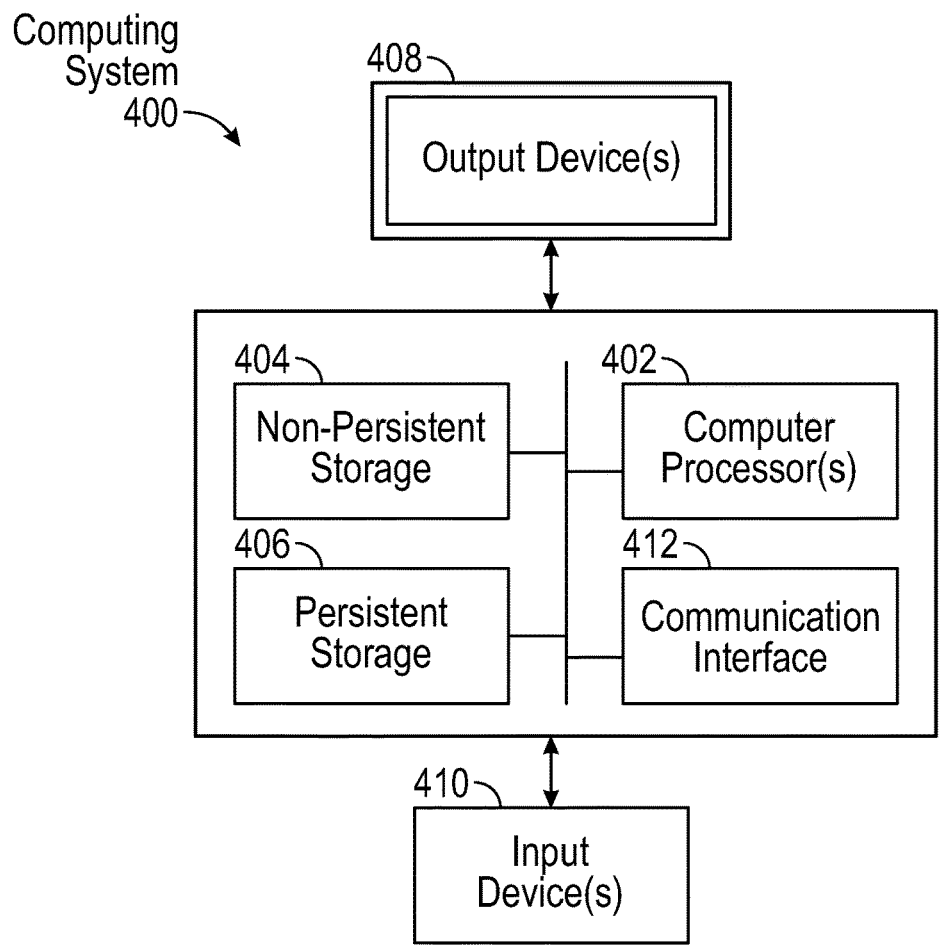
FIGS. 4A and 4B show a computing system in accordance with one or more embodiments.

Embodiments may be implemented on a computing system. Any combination of mobile, desktop, server, router, switch, embedded device, or other types of hardware may be used. For example, as shown in FIG. 4A, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 4B:
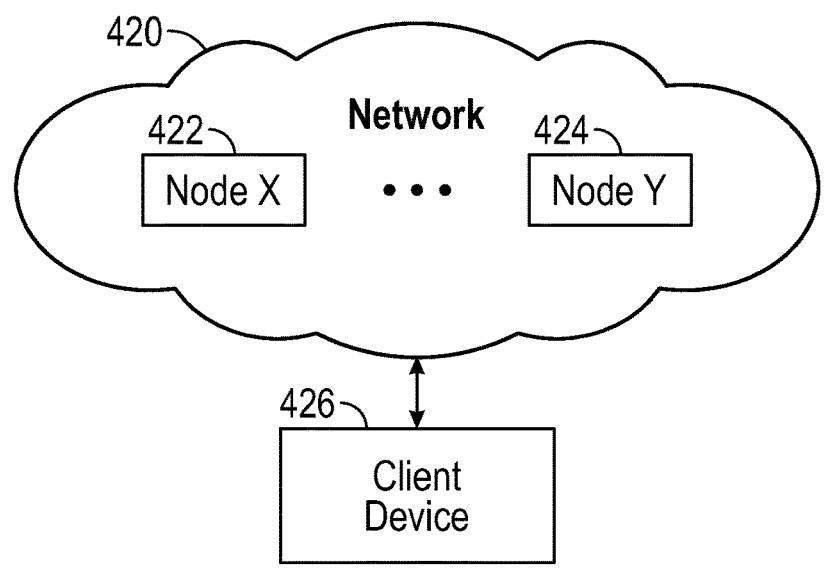

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (400) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (for example, node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4A. Further, the client device (426) may include or perform all or a portion of one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A measuring device for a tube, comprising:
    a drift tool configured to verify roundness of the tube;
    a first electromagnetic (EM) emitter disposed on the drift tool and configured to emit EM waves while the drift tool drifts inside the tube; and
    an EM receiver disposed on the drift tool and configured to receive the EM waves reflected from an internal surface of the tube,
    wherein parameters of the emitted and received EM waves comprising a wavelength, a wave incidence angle, and a wave travel time of the EM waves, are analyzed to compute an internal diameter of the tube.

2. The measuring device of claim 1, further comprising:
    a second EM emitter disposed on the drift tool and configured to further emit the EM waves while the drift tool drifts inside the tube,
    wherein the first EM emitter and the second EM emitter are disposed at opposite sides of the EM receiver.

3. The measuring device of claim 2,
    wherein the first EM emitter emits the EM waves when the drift tool drifts inside the tube in a direction leading by the first EM emitter, and
    wherein the second EM emitter does not emit any EM waves when the drift tool drifts inside the tube in the direction leading by the first EM emitter.

4. The measuring device of claim 3,
wherein the EM receiver is disposed at a middle point of the drift tool, and
wherein the first EM emitter and the second EM emitter are disposed at opposite ends of the drift tool.

5. The measuring device of claim 3,
wherein the EM receiver, the first EM emitter, and the second EM emitter are disposed on a cylindrical surface of the drift tool.

6. The measuring device of claim 5,
wherein each of the EM receiver, the first EM emitter, and the second EM emitter has a ring shape around a cross sectional circumference of the cylindrical surface of the drift tool.

7. The measuring device of claim 1, further comprising:
a controller to activate the first EM emitter and the EM receiver; and
a computing device configured to analyze the parameters of the emitted and received EM waves to compute the internal diameter of the tube,
wherein at least one of the controller and the computing device is integrated with the drift tool.

8. The measuring device of claim 1,
wherein the tube is an Oil Country Tubular Good (OCTG).

9. The measuring device of claim 8,
wherein the drift tool is specified based on American Petroleum Institute (API) specification.

10. A method to measure a tube, comprising:
disposing a drift tool inside the tube to verify roundness of the tube;
disposing a first electromagnetic (EM) emitter on the drift tool that emits EM waves while the drift tool drifts inside the tube;
disposing an EM receiver on the drift tool that receives the EM waves reflected from an internal surface of the tube;
analyzing parameters of the emitted and received EM waves to compute an internal diameter of the tube;
causing, using at least one of: a vacuum pull through mechanism, a compressed air pull through mechanism, and a rope pull through mechanism, the drift tool to drift inside the tube at a predetermined speed; and
determining, based on the parameters of the emitted and received EM waves, a gap distance between the internal surface of the tube and a cylindrical surface of the drift tool,
wherein the internal diameter of the tube is determined as a sum of the gap distance and a predetermined outer diameter of the drift tool, and
wherein the parameters of the emitted and received EM waves comprise a wavelength, a wave incidence angle, and a wave travel time of the EM waves.

11. The method of claim 10, further comprising:
disposing a second EM emitter on the drift tool that further emits the EM waves while the drift tool drifts inside the tube,
wherein the first EM emitter and the second EM emitter are disposed at opposite sides of the EM receiver.

12. The method of claim 11,
wherein the first EM emitter emits the EM waves when the drift tool drifts inside the tube in a direction leading by the first EM emitter, and
wherein the second EM emitter does not emit any EM waves when the drift tool drifts inside the tube in the direction leading by the first EM emitter.

13. The method of claim 12,
wherein the EM receiver is disposed at a middle point of the drift tool, and
wherein the first EM emitter and the second EM emitter are disposed at opposite ends of the drift tool.

14. The method of claim 12,
wherein the EM receiver, the first EM emitter, and the second EM emitter are disposed on a cylindrical surface of the drift tool.

15. The method of claim 14,
wherein each of the EM receiver, the first EM emitter, and the second EM emitter has a ring shape around a cross sectional circumference of the cylindrical surface of the drift tool.

16. The method of claim 10, further comprising:
activating by a controller, the first EM emitter and the EM receiver; and
analyzing, by a computing device, the parameters of the emitted and received EM waves to compute the internal diameter of the tube,
wherein at least one of the controller and the computing device is integrated with the drift tool.

17. The method of claim 10,
wherein the tube is an Oil Country Tubular Good (OCTG).

18. The method of claim 17,
wherein the drift tool is specified based on American Petroleum Institute (API) specification.

* * * * *